E. O'REILLY.
ANIMAL TRAP.
APPLICATION FILED DEC. 13, 1916.

1,287,407.

Patented Dec. 10, 1918.

WITNESSES
W. C. Fielding
Ross J. Woodward

INVENTOR
Edward O'Reilly

BY Richard Owen
ATTORNEY

UNITED STATES PATENT OFFICE.

EDWARD O'REILLY, OF MOUNT KISCO, NEW YORK.

ANIMAL-TRAP.

1,287,407.

Specification of Letters Patent.  Patented Dec. 10, 1918.

Application filed December 13, 1916. Serial No. 136,712.

*To all whom it may concern:*

Be it known that I, EDWARD O'REILLY, a British subject, residing at Mount Kisco, in the county of Westchester and State of New York, have invented certain new and useful Improvements in Animal-Traps, of which the following is a specification.

This invention relates to an improved trap and the principal object of the invention is to provide a trap in which the door may be releasably held in a raised position by the bait with the bait serving as a weight and the door closing of its own weight when the bait is removed thus preventing the rat from leaving the trap.

Another object of the invention is to so construct this improved trap that the bait may be easily removed by the rat thus insuring the closing of the door.

Another object of the invention is to so construct this trap that the body portion thereof may be formed of wire and the door and sliding tracks for the door of tin.

This invention is illustrated in the accompanying drawings, wherein:—

Figure 1:
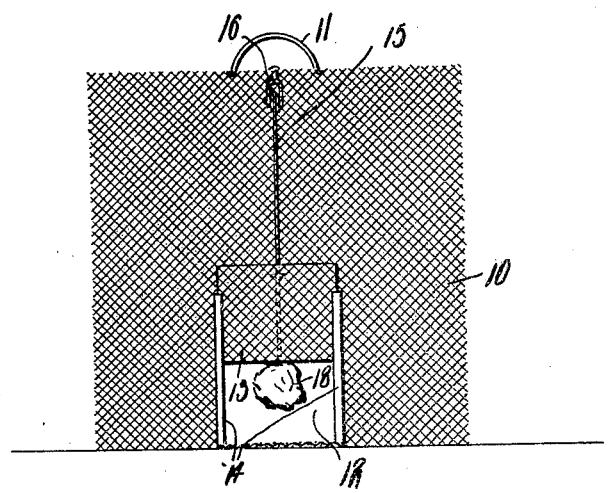
Figure 1 is a view showing the improved trap in front elevation.

The body or housing 10 is formed of wire and is provided with a handle 11 by means of which the trap may be carried. This housing has been shown formed of wire but it is understood that it may be formed of any suitable material and may be perforated or not according to the wishes of the person constructing the trap.

The doorway or entrance 12 is formed in the lower portion of the front wall of this housing and will be closed by the sliding door 13 which door is slidably mounted in the track 14. A line 15 is connected with the door and is led over the pulley 16 connected with the upper wall of the housing and has its free end portion connected with a prong 17.

Figure 2:
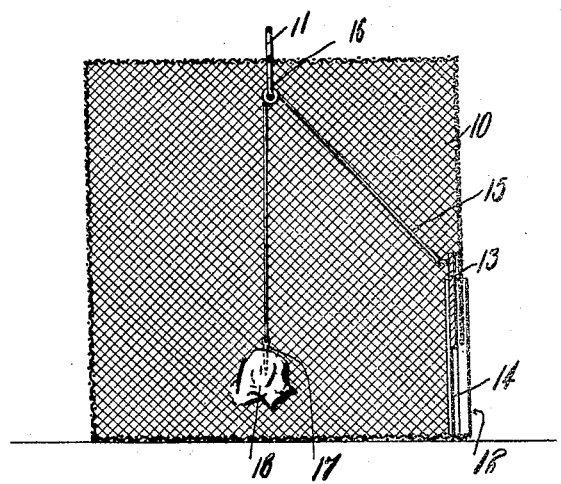
Fig. 2 is a vertical sectional view through the trap.

When in use, the bait 18 which will be a piece of meat or any other material which will attract the rat and which will be of sufficient weight to counter-balance the door 13, will have the prong 17 inserted therein and will serve not only to counter-balance the door but also serve as bait. It should be noted that this bait is of such weight that it will hold the door in a raised position with the bait suspended a short distance above the flooring of the housing as shown in Fig. 2. After the trap is set, the door will be opened and the rat will enter the housing and eat the bait. In doing so, the bait will be drawn from the prong 17 and as the weight will then be removed, the door will close thus imprisoning the rat.

It will thus be seen that a very efficient trap has been provided which is simple in construction and which is further so constructed that the bait itself will serve as means for releasably holding the door in a raised position and therefore catches or triggers for this purpose are not necessary.

What is claimed is:—

A trap comprising a body having a door opening in the lower portion of a wall thereof, a vertically sliding door closing the door opening, a guide at the top of the body, a flexible element suspended between its ends from the said guide and having one end attached to the door, and a bait receiving element at the remaining end of the flexible element to releasably support the bait a distance from the bottom of the trap, the door being held elevated by the bait and automatically closing when the bait is detached from the bait receiving element.

In testimony whereof I affix my signature in presence of two witnesses.

EDWARD O'REILLY.

Witnesses:
EDWARD HELLER,
MATTHEW J. O'BRIEN.

Copies of this patent may be obtained for five cents each, by addressing the "Commissioner of Patents, Washington, D. C."